April 21, 1936.  A. G. DECKER  2,038,422
BENCH DRILL STAND
Filed Oct. 31, 1933  2 Sheets-Sheet 1
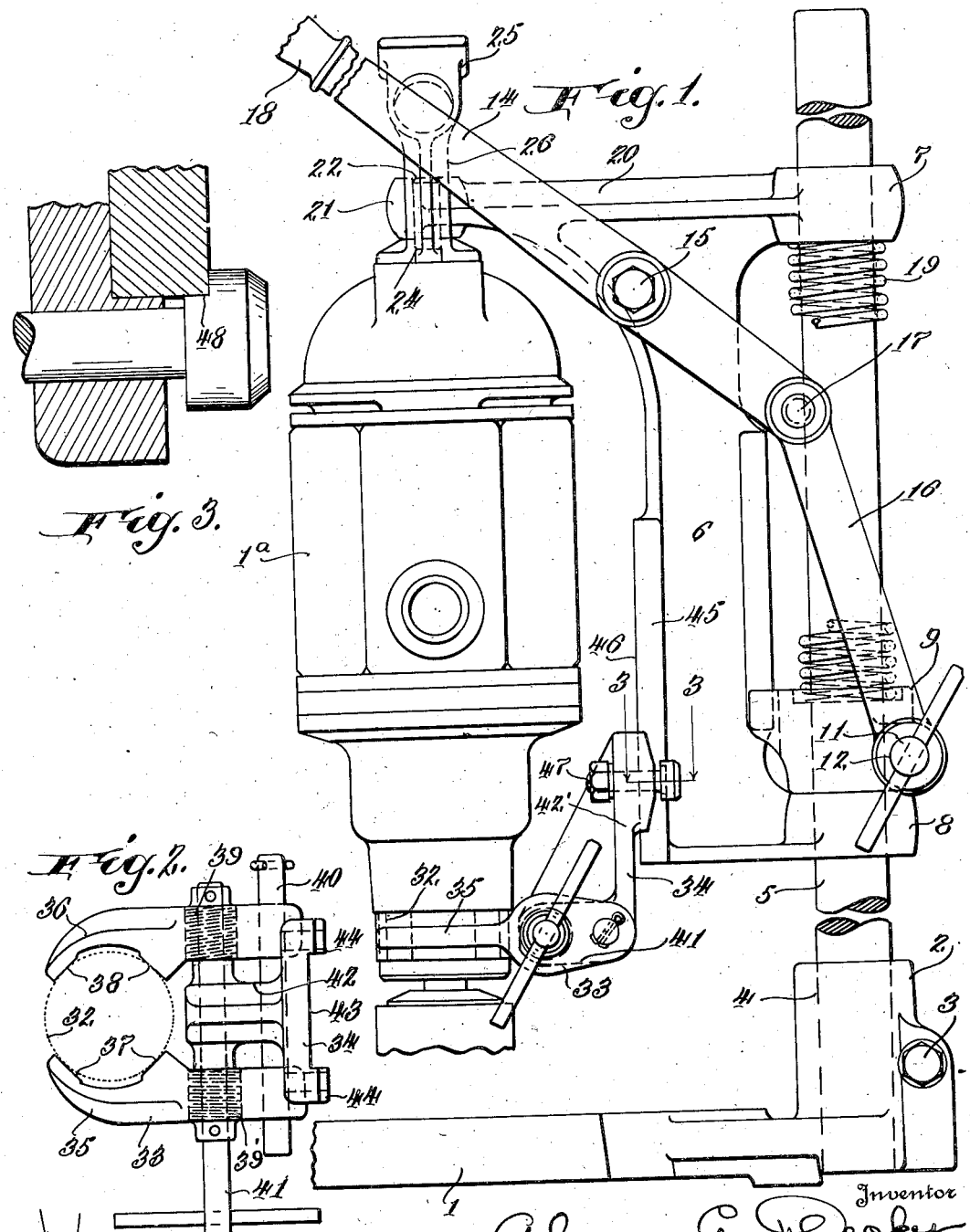

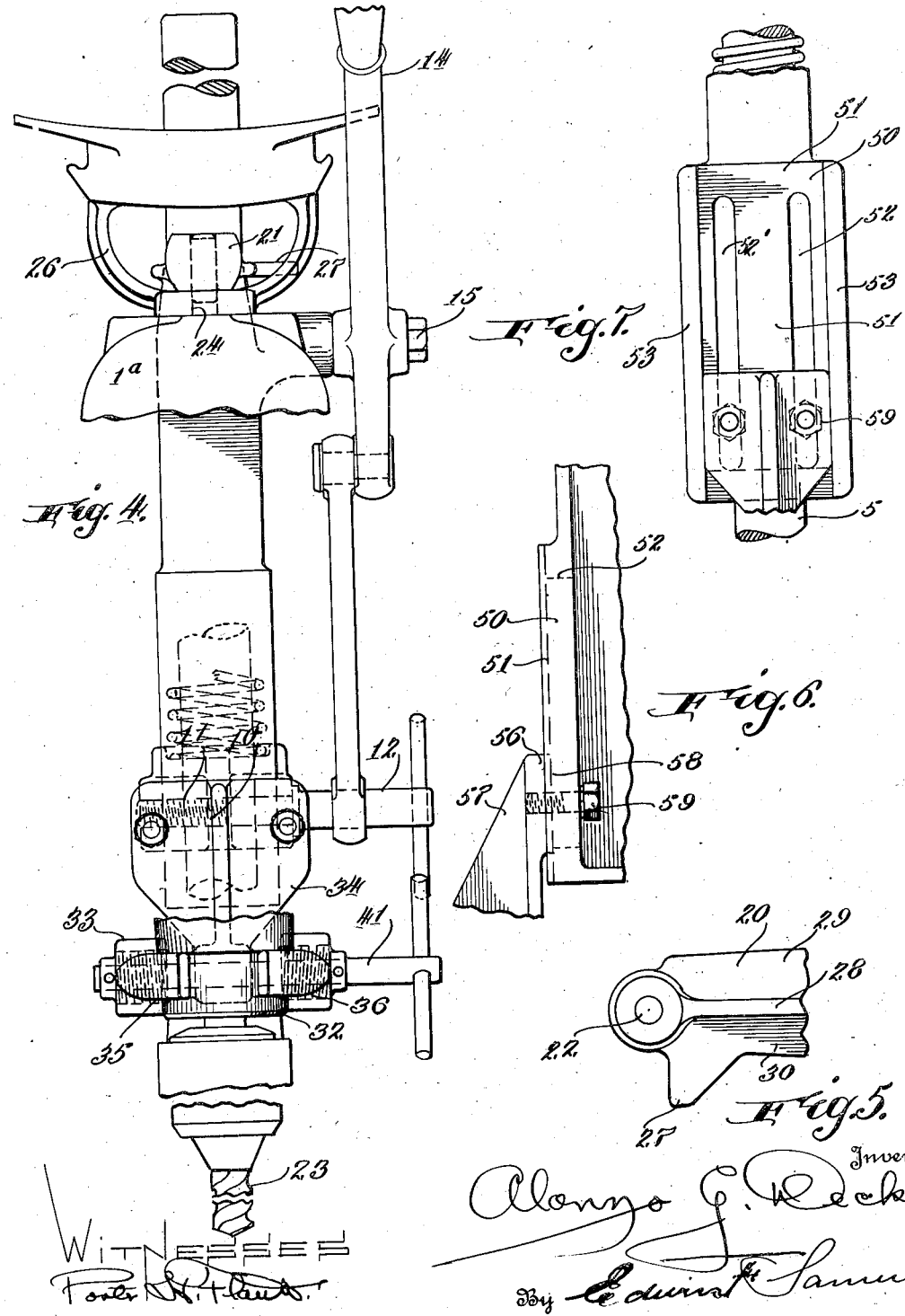

Patented Apr. 21, 1936

2,038,422

UNITED STATES PATENT OFFICE 2,038,422

BENCH DRILL STAND

Alonzo G. Decker, Baltimore County, Md., assignor to The Black & Decker Manufacturing Company, a corporation of Maryland Application October 31, 1933, Serial No. 695,997

6 Claims. (Cl. 77—6)

The invention relates to a bench drill stand which is an appliance whereby a manually portable power driven drill as an electric drill, or, if desired, a drill having a pneumatic drive, is supported and controlled in such a way that it serves the purposes of and is usable after the manner of a bench drill.

The bench drill stands of this general type have been in use for several years. In accordance with the prevailing practice the portable power driven drill which is available for use in this way is clamped to a carriage mounted on a vertical guide. The drill is then held with its axis in upright position and adapted to be fed forwardly in the direction of its axis and duly retracted, the portable tool being moved in the drilling operation by means of a hand lever which is similar in its operation to the hand lever of a bench drill, thus making the portable tool available for the purposes of a bench drill.

The present invention relates to features and details of this machine whereby the portable power driven electric or other power actuated portable drill to be used with the stand is rigidly clamped and instantaneously released and whereby it is aligned and controlled in such a manner as to do the most accurate and uniform work in the easiest and most convenient manner, an important advantage of the invention being that the tool is automatically centered and aligned and instantaneously clamped and released by means of a single screw or other clamping member and it is of particular importance that the bench drill stand of the invention is adapted to any size and/or standard make of portable drill, which is thus clamped, centered and aligned in the shortest period of time and without variation in the accuracy with which the tool is positioned and fed forwardly in the direction of its axis in the drilling operation.

In the accompanying drawings I have illustrated a bench drill stand embodying the features of the invention in the preferred form.

In the drawings:

Figure 1 is a side elevation of the apparatus in operative position, the stand being broken away at various points for convenience of illustration.

Figure 2 is a plan view of the nose clamp, the nose of the drill being shown in dotted lines in its operative relation thereto.

Figure 3 is a section on the line 3, 3 of Figure 1.

Figure 4 is a front elevation of the stand and the portable drill with which the stand is operatively engaged, the drill being broken away for convenience of illustration.

Figure 5 is a fragmentary top plan of the outer end of the upper part of the tool holding bracket including the centering pin and detent lug.

Figure 6 is a side elevation of a modified form of yoke and support.

Figure 7 is a front elevation of the same, the support being in both figures removed from the remainder of the stand for convenience of illustration.

Referring to the drawings by numerals, each of which is used to indicate the same or similar parts in the different figures, the construction shown comprises a base 1, which in accordance with the established practice would be supported on a bench. This base is provided at the side with a split boss 2 adapted to be closed by a suitable clamping screw 3, the aperture 4 in the boss having its axis disposed in a vertical direction. In this boss is seated a vertical column 5 on which the tool carriage 6 is mounted to slide. This carriage is provided at its upper and lower ends with collars 7 and 8, mounted on the column 5 to slide freely relatively thereto. Between these collars 7, 8 and serving to limit the upward motion of the lower collar 8 and to contact the same in its upper position is a fulcrum block 9 which is suitably split as shown in dotted lines at 10 in Figure 4 and clamped in adjusted position by means of a screw 11 formed on the fulcrum pin 12.

The carriage 6 is moved downwardly in the drilling operation by means of a hand lever 14 pivoted at 15 near its center on the bracket 6 and connected at its end by means of a link 16 to the fulcrum pin 12 to which the link 16 is pivotally connected at its lower end, being hingedly connected at its upper end at 17 to the end of the hand lever 14 on the opposite side of the pivot 15 from the hand grip of said lever. The coil spring 19 is shown as encircling the column 5, bearing at one end against the fulcrum block 9 which serves as an abutment and at its other end against the bottom face of the upper collar 7 of the carriage 6. The spring 19 in the drawings is broken away at the center for convenience of illustration.

So much of the structure as has been described is more or less typical of the prior art being at present in use. Applicant's improvement consists in the manner of clamping and centering the portable power driven drill which is to be mounted on the stand and aligning the same, and in applicant's construction whereby any size and almost any type of portable power driven drill, Ia, can be instantaneously clamped, centered and aligned and likewise instantaneously released when desired.

In accordance with the improvement of the invention, the carriage 6 comprises a laterally extending arm 20 having at its outer end a boss 21 having centering means for the drill shown in the form of a centering pin 22. This pin engages and preferably fits in a round hole 24 which may be in the top of the casing, being in the form of the invention shown formed in the spade handle 25 extending in the direction of the bit axis from the bottom inner surface of the loop or eye 26 of said handle. The drill casing is prevented from turning in response to the reaction of the torque of the motor by means of a lug 27 (see Figure 5) which projects at right angles to the arm 20 engaging the spade handle or other portion of the drill casing. In this connection it should be noted, see Figure 5, that the arm 20, in order to give it sufficient strength without objectionable weight, is formed with a top rib 28 and laterally extending flanges 29, 30, the lug 27 being in the form shown an extension of the latter flange.

In devising the bench drill stand of the invention, advantage has been taken of the fact that substantially all portable drills of this general type are formed with a cylindrical nose portion indicated in Figures 1 and 4 at 32. In accordance with the invention, this nose portion is clamped and centered in alignment with the centering pin 22 at the top which engages the hole 24, and in alignment with the axis of the bit 23 and this clamping of the nose 32 is effected by means of a clamp 33 illustrated in Figure 2 in connection with its carrier bracket 34. This clamp comprises vise jaws 35 and 36, having concentrically and inwardly disposed gripping portions 37 and 38, the jaws 36 being mounted to slide and hence guided by a pin 40 at right angles to the axes of the gripping portions 37 and 38, and at right angles to the length of the jaws, and the jaws are actuated by right and left handed screws 39 and 39' mounted on the screw shaft 41.

The guiding of the jaws as illustrated and particularly the use of the right and left handed screw thread causes these jaws to have a centering action in clamping so that whatever the size of the drill and the diameter of its nose portion, it will be so centered as to place the bit in a predetermined location and in combination with the centering device in a predetermined alignment. The vice jaws 35 and 36 as shown are carried on the yoke or carrier bracket 34 which extends between the jaws and provides guiding openings and a support for the screw shaft 41 and the guide pin 40, the lower arm 42 of said yoke which is shown as L shaped with said lower arm extending between the jaws being suitably bored for this purpose. The upright arm 42' of the L shaped yoke is shown as provided with a finished aligning surface 43 having lugs at each side at 44. These lugs in the preferred form shown take over the edges of an accurately machined vertical guide member 45 formed on the carriage 6 and extending upwardly from the lower end thereof and on the opposite side of the carriage 6 from the column 5. The aligning surface 43 bears against the finished front surface 46 of the guide member, and the lugs 44 at the sides take over the lateral edges of the guide member 45. The yoke or bracket 34 is held in adjusted position supporting the vise jaws 35 and 36 at the desired elevation by means of clamping screws 47 extending through the upright arm 41' of the bracket and engaging the back corner edges of the guide 45, the heads of these bolts being rabbeted as shown at 48 in Figure 3 to engage the guide 45 from the back and prevent rotation of the bolts so that they may be suitably tightened. It will be understood from the above description that the jaws 35 and 36 are by operation of the screws 39—39' to obtain the result stated maintained at all times in symmetrical relation to and with the predetermined line of the drill axis.

Figures 6 and 7 show an alternative form of guide and bracket, the guide 50 which is formed on the carriage in place of the guide 45, Figure 1, comprises a vertical guide surface 51 slotted in the direction of its length at 52 and 52'. This guide surface 51 is provided with longitudinal edge ribs 53 at each side projecting outwardly and forwardly from the guiding surface on the side opposite to the column 5 and the aligning lug 56 of the bracket 57 which corresponds to the bracket 34 previously described, has a flat finished aligning surface 58 which engages the flat vertical surface 51 of the guiding member 50 and fits between the ribs 53 movable vertically thereon and being held in adjusted position by bolts 59 which are passed through the slots 52 and 52' and seated in the aligning lug 56 or otherwise secured.

In the operation of the bench drill stand a portable power driven drill, Ia, is clamped to the carriage 6, being positioned at the top by the pin 22 which is seated in a hole 24 which is preferably in line with the axis of the bit 23, the lower surface of the boss 21 bearing on the surface of the tool frame surrounding the hole. The drill Ia of the form shown is provided with a spade handle 25 and the hole 24 enters from the inside of the loop of the handle at the bottom in alignment with the bit axis, and the boss 21 of the arm 20 is within the loop 25 of the handle 26 bearing on the upwardly disposed surface of the bottom of the loop on the handle. The tendency of the tool to rotate in response to the reaction of the torque is preferably taken up and rotation of the tool prevented by contact of the handle or any available portion of the casing with the lug 27 on the arm 20. When the handle has been centered, the neck 32 with which the drill bit 23 is concentric is clamped between the jaws 35, 36 and thus centered and with the bit parallel to the column the tool is also held against rotation by the jaws in combination with or if desired independently of the lug.

While the hole 24 is preferably in alignment with the drill bit 23, it will be apparent that it may, if the tool, Ia, is so constructed as to require it, be off-set, the arm 20 being correspondingly formed, the tool being thus centered by the clamp 33 and aligned by the pin 22, the object being to hold and to automatically align the drill bit 23 in parallellism with the column 5 and hence in alignment with the direction of motion of the drill as the carriage moves up and down on the column.

When the drill is thus centered, aligned and clamped and a hole is to be drilled, the tool Ia is suitably energized and is then moved downwardly bringing the bit 23 into contact with the work by pressing down on the handle 18 when the drill moves downwardly in a direction parallel to the column and in alignment with the bit 23 compressing the spring 19. When the hole has been drilled, the spring 19 tends to withdraw, the tool by its tendency to expand and the downward pressure on the handle 18 being released, the tool is returned to its upper position and the bit withdrawn.

The improved construction shown is adapted to instantaneously clamp, center and align a drill of suitable pattern and of any dimension. As the features of the drill as described are of general occurrence, the improved bench drill stand described is available for use with drills of various makes, sizes and patterns. It is particularly adapted for use with a drill having a round or substantially circular nose and equipped with a spade handle which is aligned with the aid of the nose and bit, but is capable of use with portable drills of various constructions varied to a considerable degree from the one shown.

I have thus described specifically and in detail a bench drill stand embodying the features of my invention in the preferred form in order that the manner of constructing, applying and using the invention may be fully understood, however, the specific terms herein are used descriptively rather than in a limiting sense, the scope of the invention being defined in the claims.

What I claim as new and desire to secure by Letters Patent is:

1. In a bench drill stand for use with a portable power driven drill having a spade handle and a substantially cylindrical nose at the end opposite the handle, the stand having a guide with a carriage mounted thereon to slide in the direction of the length of the guide, and means for moving the carriage with the drill thereon in the drilling operation to advance and retract the drill, the carriage having a lateral arm, engaging the upwardly disposed surface at the bottom of the loop of the spade handle with centering means to center the rear end of the drill, a detent on said arm engaging the spade handle to prevent rotation of the drill, and means for clamping the nose of the portable drill adjacent the chuck which holds the bit, comprising a jaw clamp having oppositely disposed jaws with concentrically concave engaging surfaces, a guide for the jaws to confine them to a path at right angles to the motion of the carriage and a single means for operating the jaws oppositely and simultaneously, automatically centering the nose of the drill as the jaws are moved together.

2. In a bench drill stand for a portable power driven drill having a substantially cylindrical nose, the stand having a carriage, a support on which the carriage is mounted to slide, and the carriage having an abutment to engage the rear end of the drill casing, and means for centering the rear end of the drill, a jaw clamp on the carriage for clamping the nose of the drill to position the drill with its axis parallel to the direction of motion of the carriage, said jaw clamp comprising a plurality of jaws mounted to move transversely to the axis of the drill and the direction of motion of the carriage and having concentric inwardly disposed surfaces to engage the opposite sides of the nose and a single means for moving said jaws simultaneously and at equal speeds toward each other to clamp and center the nose of the drill and for retracting them.

3. A bench drill stand comprising a carriage, a support on which the carriage is mounted to slide, and means for clamping a portable power driven drill to the carriage with its axis parallel to the direction of motion of the carriage, the carriage having an abutment to engage the rear end of the drill casing, means for centering the rear end of said drill casing, the carriage also being provided at its opposite end with a jaw clamp for clamping the nose of the drill, said jaw clamp comprising a plurality of jaws a guide on which they are mounted to move transversely to the axis of the drill and the direction of motion of the carriage the jaws having concentric concave portions to engage the opposite sides of the nose, a single means for moving said jaws simultaneously toward and from each other maintaining the jaws in symmetrical relation to the predetermined line of the drill axes to clamp and center automatically the nose of the drill, an integral support for the jaws mounted for adjustment along the carriage in the direction of motion of the carriage, and means for securing the support in various positions of adjustment, the adjustment of the position of the support and the operation of the clamping jaws providing for the clamping and centering of portable drills of various nose diameters and lengths.

4. In a bench drill stand for a portable power drill, the stand having a carriage with a guide on which the carriage is mounted to slide, and manually controlled means for moving the carriage to advance and retract the drill and the drill bit, means for clamping the drill to the carriage with the bit axis aligned with the direction of motion, said means comprising an abutment for engaging and positioning the rear end of the drill to center the said rear end with said line and movable concentrically concave clamping jaws for clamping and centering the nose of the drill with said predetermined axial line, a single means for engaging said respective jaws, and means for guiding the jaws to move on a path at right angles to said axis, said single means being adapted to move the jaws simultaneously toward and from each other, maintaining them in symmetrical relation with the said predetermined line of the drill axis to clamp and center the nose with said axial line.

5. In a bench drill stand having a carriage with a guide on which the carriage is mounted to slide, and manually controlled means for moving the carriage to advance and retract the drill and the drill bit, and an abutment for supporting and positioning the rear end of the drill, simultaneously movable clamping jaws for clamping and positioning the nose of the drill, an integral bracket carrying the jaws and a guide and support for the bracket on the carriage, said guide having a positioning surface parallel to the motion of the carriage and means for clamping said bracket to the guide and in contact with said positioning surface to be aligned and supported thereby in a series of positions of adjustment providing for the use of drills of different lengths, the bracket having ears at the sides to straddle said guide and clamping screws at each side to take over the edge of the guide, said clamping screws having their heads rabbeted to engage the edges of the guide to prevent rotation of the screws.

6. In a bench drill stand having a carriage with a guide on which the carriage is mounted to slide, manually controlled means for moving the carriage to advance and retract the drill and the drill bit, and means for clamping the drill to the carriage with its axis parallel to the direction of motion, said means comprising an abutment for engaging the rear end of the drill and simultaneously movable clamping jaws for clamping and positioning the nose of the drill, a bracket carrying the jaws and a guide and support for the bracket on the carriage, said guide having a positioning surface parallel to the motion of the carriage and means for clamping said bracket to the guide and in contact with said positioning surface to be positioned thereby in a series of positions of adjustment providing for the use of drills of different lengths, the guide having projecting edge ribs and the bracket having a lug fitting between the ribs and a flat surface engaging a corresponding flat surface, said surface being formed on the guide between said ribs, and clamping screws for clamping the lug to the guide in a series of positions of adjustment.

ALONZO G. DECKER.